United States Patent [19]
Fournier

[11] Patent Number: 6,052,651
[45] Date of Patent: Apr. 18, 2000

[54] STATISTICAL METHOD OF CLASSIFYING EVENTS LINKED WITH THE PHYSICAL PROPERTIES OF A COMPLEX MEDIUM SUCH AS THE SUBSOIL

[75] Inventor: Frédérique Fournier, Cormeilles en Parisis, France

[73] Assignee: Institute Francais du Petrole, Rueil-Malmaison, France

[21] Appl. No.: 09/157,572

[22] Filed: Sep. 21, 1998

[30] Foreign Application Priority Data

Sep. 22, 1997 [FR] France .................................. 97 12182

[51] Int. Cl.[7] ...................................................... G01V 1/34
[52] U.S. Cl. ................................................ 702/14; 702/16
[58] Field of Search .......................... 702/14, 16; 307/73; 367/33

[56] References Cited

U.S. PATENT DOCUMENTS

| | | | |
|---|---|---|---|
| 4,559,602 | 12/1985 | Bates, Jr. .................................. | 364/487 |
| 4,791,998 | 12/1988 | Hempkins et al. ........................ | 175/61 |
| 4,926,394 | 5/1990 | Doyne ........................................ | 367/73 |
| 4,937,747 | 6/1990 | Koller ........................................ | 364/422 |
| 5,012,675 | 5/1991 | Koller et al. .............................. | 73/432.1 |
| 5,440,525 | 8/1995 | Dey-Sarkar et al. ...................... | 367/52 |
| 5,444,619 | 8/1995 | Hoskins et al. ........................... | 364/421 |
| 5,487,001 | 1/1996 | Neff .......................................... | 364/421 |
| 5,511,008 | 4/1996 | Flament et al. ........................... | 364/572 |
| 5,638,269 | 6/1997 | Fournier et al. .......................... | 364/422 |
| 5,706,194 | 1/1998 | Neff et al. ................................. | 364/421 |
| 5,706,402 | 1/1998 | Bell ............................................ | 395/23 |
| 5,787,050 | 7/1998 | Slevinsky .................................. | 367/25 |
| 5,835,883 | 11/1998 | Neff et al. ................................. | 702/7 |
| 5,838,634 | 11/1998 | Jones et al. ............................... | 367/73 |
| 5,852,588 | 12/1998 | De Hoop et al. ......................... | 367/38 |

OTHER PUBLICATIONS

"A Statistical Methodology for Deriving Reservoir Properties from Seismic Data" by Frédérique Fournier et al, appearing in *Geophysics*, Soc. of Exploration Geophysicists, Tulsa, OK, USA, vol. 60, No. 5 (Sep.–Oct. 1995), p. 1437–1450.

*Primary Examiner*—Christine K. Oda
*Assistant Examiner*—Victor J. Taylor
*Attorney, Agent, or Firm*—Antonelli, Terry, Stout & Kraus, LLP

[57] ABSTRACT

A method of determining the position in subsoil of a population of physical phenomena linked with physical properties of the subsoil. Data are collected, for example, subsoil exploration or in-situ measurements. The phenomena are marked by points in a multivariate space and defined by an attribute vector, the coordinates of each of the points being attributes associated with the phenomena, using a function expressing a multivariate probability law appropriate for the population. Modes corresponding to higher density zones of the function are selected, the number of modes giving a number of potential losses in the population of the phenomena. For each mode a set of selected point marks the most representative events of each class. A classifying function is determined from the selected points, and the probabilities of non-selected points belonging to each of the potential classes is determined by using the determined classifying functions. The position of the physical phenomena in the subsoil is determined from the determined probabilities.

9 Claims, 8 Drawing Sheets

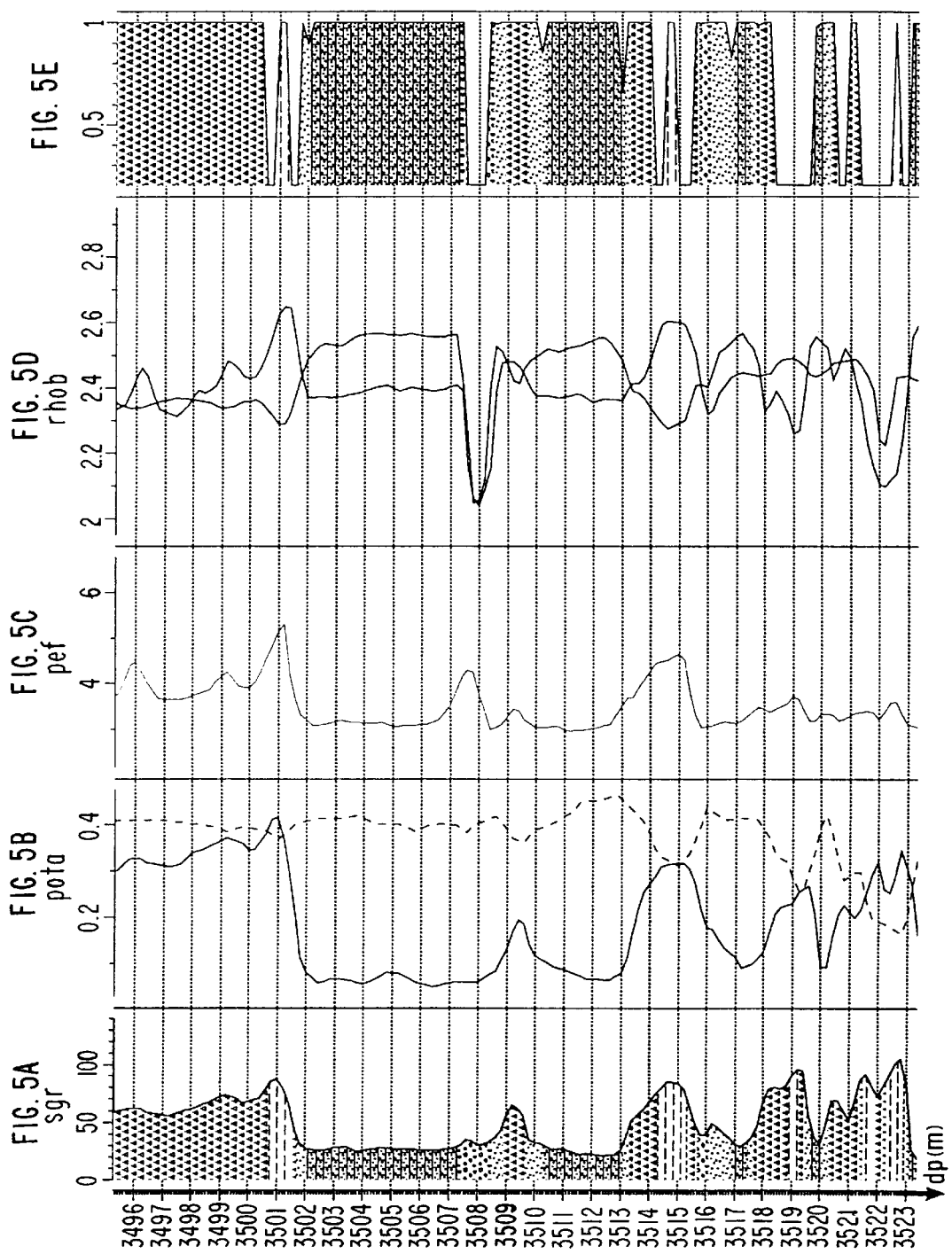

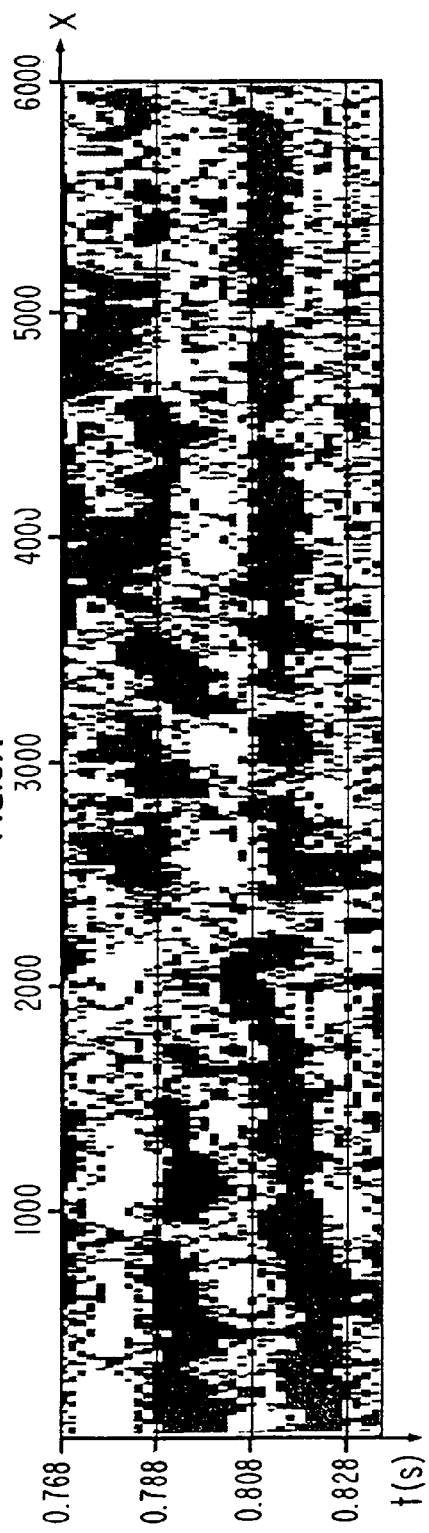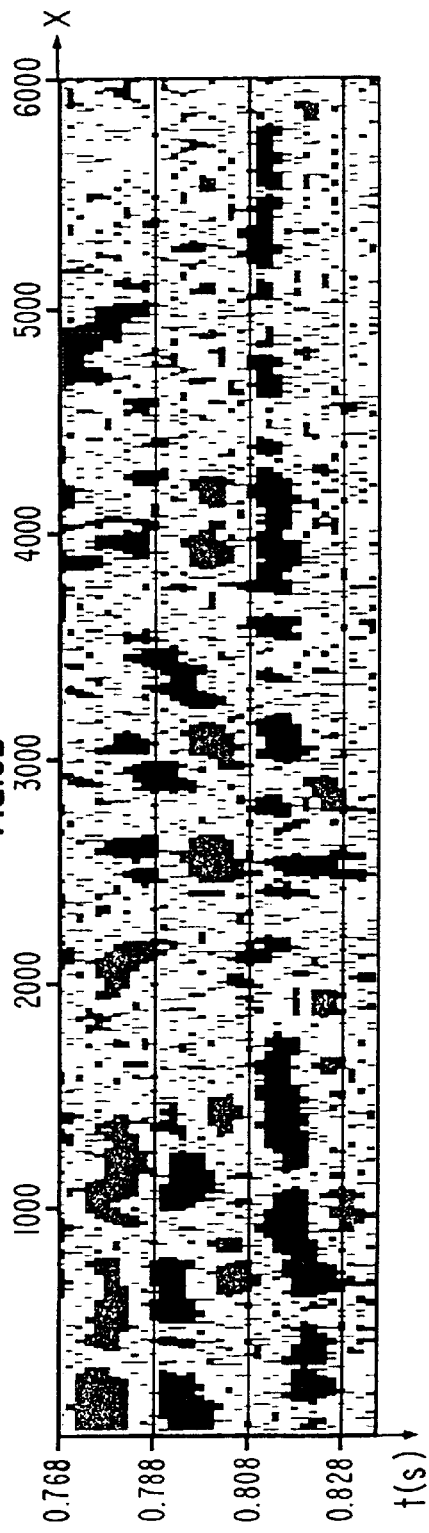

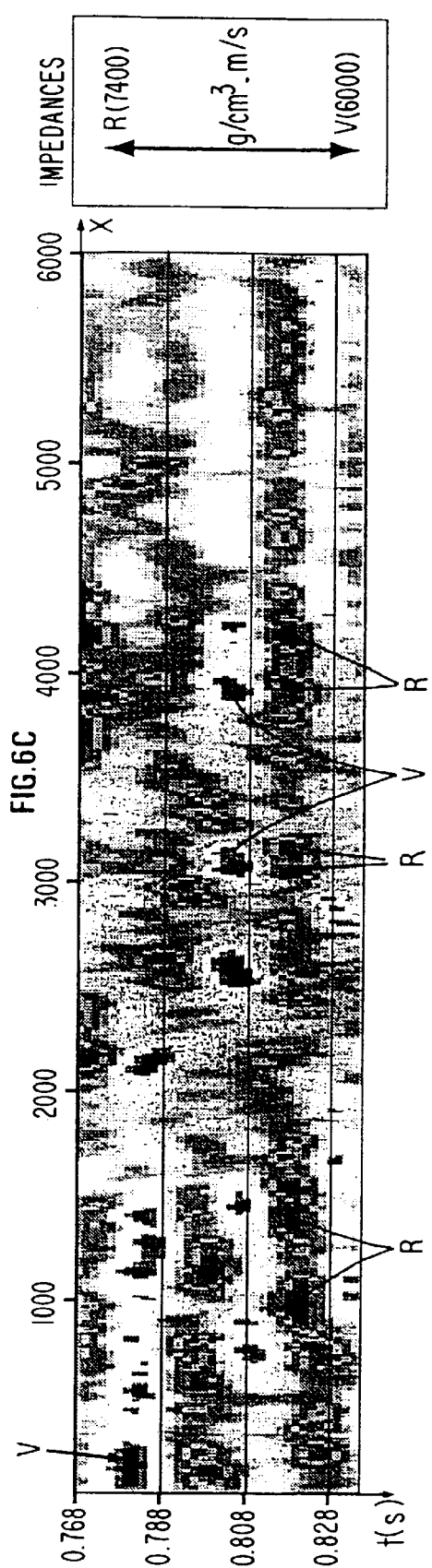
FIG.6C
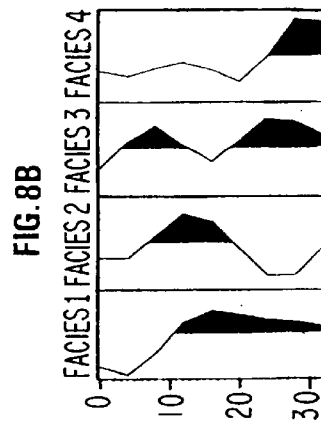
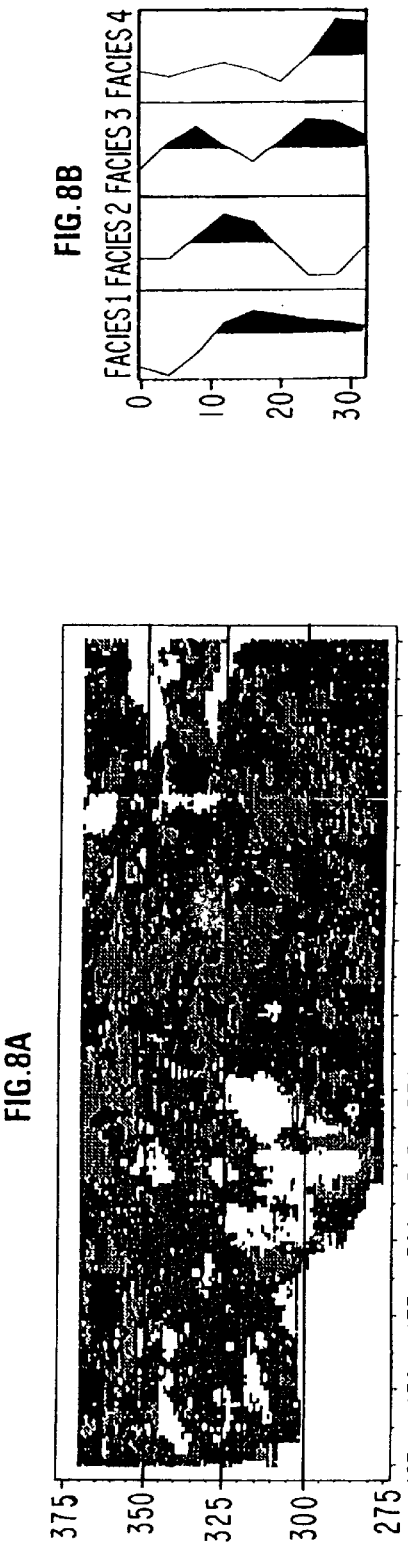
FIG.8B
FIG.8A

STATISTICAL METHOD OF CLASSIFYING EVENTS LINKED WITH THE PHYSICAL PROPERTIES OF A COMPLEX MEDIUM SUCH AS THE SUBSOIL

FIELD OF THE INVENTION

The present invention relates in a general way to a statistical method of classifying various events defined by attributes, which are linked with the physical properties of a complex medium such as the subsoil. The events may be events of a geological, geophysical nature or data relative to the production of fluids, etc.

The method according to the invention finds applications in particular in the field of oil-bearing reservoir exploration.

BACKGROUND OF THE INVENTION

Interpretation of measurements in the field of geosciences (geology, geophysics or reservoir engineering) requires processing a large amount of data, often characterized by many parameters. Multivariate statistical methods are then used to solve various measurement characterization and interpretation problems. In particular, a problem that is frequently encountered is the definition of a typology of geologic or geophysical objects from indirect measurements carried out thereon. Examples thereof are the characterization of the seismic facies on trace portions at the level of the reservoir from seismic attributes, or the definition of electrofacies from logs.

a) Seismic facies: The parameters or attributes that characterize them are taken, for example, from seismic records. The attribute vector thus defined allows the traces to be represented as points in the space of the various attributes generated thereby. In this space, the co-ordinates of each trace are given by the values taken by the attributes on this trace (see FIG. 1). In order to group the traces together according to their proximity in the space of the attributes, well-known statistical pattern recognition techniques are applied, as described, for example, by:

Dumay J., Fournier F., 1988, "Multivariate Statistical Analyses applied to Seismic Facies recognition", Geophysics, 53, No.9, pp. 1151–1159.

Each group represents a seismic facies, i.e. a set of traces that are similar as regards the seismic nature in the sense of the attributes considered. Interpretation of the seismic facies leads to characterization of the geologic variations of the reservoir between the wells or to identification of zones where the seismic data show acquisition, processing artefacts, etc. This interpretation is performed a posteriori by analyzing correspondence with the geologic data available (well, reservoir model, etc.) when the statistical techniques implemented are classification tools (non supervised pattern recognition). On the other hand, a geologic interpretation is included in the facies determination via a priori information, with discriminant analysis tools (supervised pattern recognition). The two approaches, supervised and non supervised, are quite complementary, as shown, for example, by:

Déquirez P. Y., et al, 1995, "Integrated Stratigraphic and Lithological Interpretation of the Esat-Senlac Heavy Oil Pool", 65th Ann. Intern. Mtg. Soc. Expl. Geophys., pp. 104–107.

b) Electrofacies : They correspond to a set of points (depth points, taken from various wells, on a selected studying interval) exhibiting homogeneous characteristics for a selection of logs. Electrofacies most often have a geologic meaning (particular lithology, petrophysical properties, fluid content, etc.). As for the seismic facies analysis, statistical (supervised and non supervised) pattern recognition methods are applied to define automatically, for each well of a field, an electrofacies column.

Whatever the field of application, using statistical pattern recognition techniques allows, in addition to the classification of an object in a family, evaluation of the right classification probability. In fact, it is a probability vector that is estimated, which gives the probability of allocation in the various classes, the object being then allocated to the maximum probability class. This characterization of the uncertainty associated with the prediction of the class of belonging is particularly interesting for risk quantification.

A major difficulty with statistical pattern recognition is the determination of the correct number of "natural" classes underlying the population. This difficulty is particularly problematic in geosciences, where geologic interpretation in the broad sense of the term consists in comparing a certain model of the subsoil, which can be obtained a priori, with the indirect measurements recorded at the level of the reservoir. It is therefore very important to be able to characterize the natural structure of the measurements available. The classification methods applied in the field of geosciences do not allow solution of this problem. With learning, the number of classes is imposed by the a priori information taken into account, which can therefore bias the results. Without learning, partitioning methods are most often used, the number of classes being set by the user. It is therefore very difficult to select this parameter in an optimum way, i.e. to adapt it to the structure of the population. Conventionally, several tests are carried out with different numbers of classes, and class separability criteria are calculated in order to keep the best test, but the criteria are effective only subject to strong hypotheses on the data (according to which the classes are Gaussian for example, etc.). The technique mentioned here is described, for example, in Milligan et al., 1985, "An Examination of Procedures for Determining the Number of Clusters in a Data Set", Psychometrika, 50, 159–179.

SUMMARY OF THE INVENTION

The aim of the present invention is to detect potential classes in a population of events linked with the physical properties of a complex medium, such as the subsoil, while possibly allowing introduction of an interpretative a priori in order to validate or to invalidate some of these classes.

The potential classes are detected in a population of events located from data obtained by subsoil exploration or by in-situ measurements (events of geological or, geophysical order, or events linked with fluid production data, etc.), these events being marked by points in a multivariate space and defined by an attribute vector, the co-ordinates of these points being attributes associated with these events.

The method is characterized in that it comprises the following stages:

a) the multivariate probability law followed by the attribute vector is estimated;

b) various modes corresponding to high-density zones of the density of the function expressing said law are selected by analysis and interpretation, the number of these modes showing the number of potential classes in the population of events and, for each mode, a certain number of points representing said events, the most representative ones of each class, and c) a classifying function is determined from these points and this classifying function is used to determine the probability of the other points belonging to the various potential classes.

The attributes of the events are, for example, of a geological or geophysical nature (seismic attributes for example), or they are linked with measurements performed during the production of fluids from the medium, or defined by logging in one or more wells through the medium, etc.

In order to select the various modes corresponding to high-density zones, the density function is, for example, projected upon at least one axis ("mapping" of the function) expressing progress in the events depending on the density function, and modes corresponding to significant peaks of the density function are selected.

With the method according to the invention, no probabilistic hypothesis is made about the laws followed by the attributes: the classes found can therefore exhibit any pattern.

BRIEF DESCRIPTION OF THE DRAWINGS

Other features and advantages of the method according to the invention will be clear from reading the description hereafter, given by way of non limitative examples, with reference to the accompanying drawings wherein

FIGS. 5A to 5E furthermore show logs measured in the well by the various measuring tools (FIGS. 5b to 5d) which were used for determination of the electrofacies, a representation of the classification results in the form of pseudo-lithologic logs at the level of the wells (FIG. 5a), the probability being represented as an additional log quantifying the uncertainty of the lithologic prediction (FIG. 5e);

FIGS. 6a, 6b, 6c illustrate an example of interpretation of the seismic samples in probable lithologies;

FIG. 8a shows an example of interpretation of trace portions in classes linked with various reservoir qualities respectively associated with different shades of grey g1 to g4, where g1, which is the darkest grey, represents the poorest quality, g2, the hatched dark grey, an average quality, g3, the plain dark grey, a good quality and g4, the light grey, an excellent quality, and FIG. 8b shows the typical patterns ("photofit pictures") of the various classes or facies.

DETAILED DESCRIPTION OF THE METHOD

The objects to be classified are represented in the multivariate space of the attributes (or parameters) used to characterize them. The class detection methodology comprises three main stages.

The first stage consists in estimating the multivariate probability law followed by the attribute vector. Non parametric techniques for estimating the population density are implemented, such as the core type methods or the "closest neighbour" type methods, as described by:

Silverman, 1986, "Density Estimation for Statistics and Data Analysis", Chapman & Hall.

The second stage is a stage of analysis and interpretation of the modes (or high-density zones) detected for this probability law. The number of modes present on the density function gives the number of potential classes in the population studied. This stage implies mapping the multivariate probability density on an axis ("mapping" of the probability density). It is at this stage that an interpretative analysis of the modes is possible.

The individuals that constitute a mode, for example, are identified in diagrams involving significant attributes as regards interpretation, in order to confirm that it is desirable to keep this mode as the basic core for a class. On the other hand, a mode may not be kept in the next stage if it appears to be a mere statistical fluctuation of no relevance for interpretation. For each mode, a threshold is set on the density function, which allows selection of the most representative points of this mode, or of the future associated class, generally those in the densest zone.

The third stage consists in using the points that are the most typical of the modes selected as learning individuals for discriminant analysis techniques. Various discrimination methods can be used (linear, quadratic, non parametric, etc.), which lead to the development of a classifying function allowing allocation of a class to the individuals that do not belong to the modes (individuals in low-density zones of the attribute space). Probabilities of belonging to the various modes are calculated from this function, which then allows attributes to be allocated to the remaining individuals.

The various stages of the method are clearly illustrated in the figures.

Figure 1A:
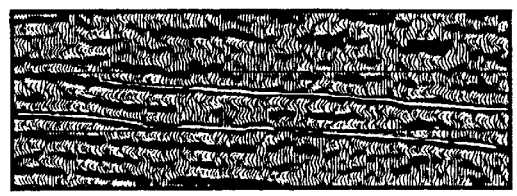
FIGS. 1A to 1C illustrate the positioning of the points representative of objects in the multivariate space of their attributes and their projections in subspaces.
Figure 1B:
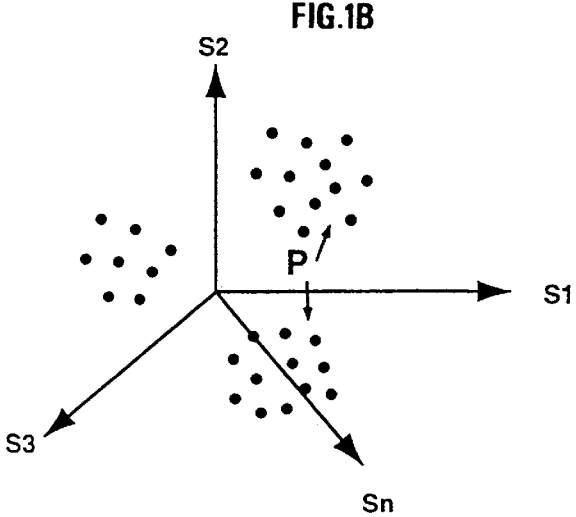
Figure 1C:
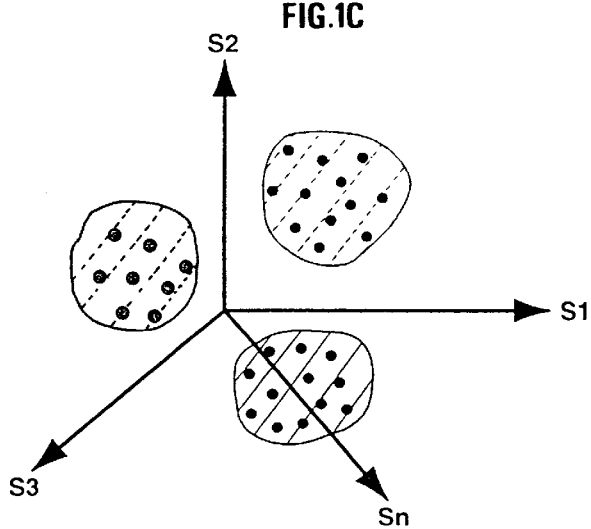

The position of the points in a multivariate space is illustrated in FIGS. 1a to 1c. The objects that can be considered (FIG. 1a) are seismic trace portions or pixels of a record section corresponding to trace samples at various successive time intervals in an analyzed time window TW or the well depth points in the case of electrofacies, etc.

They are represented as points P in the multidimensional space generated by the various parameters or attributes S1, S2, S3, Sn (FIG. 1b) which characterize them. These parameters are, for example, the seismic attributes (amplitudes, phases, instantaneous frequencies, etc.) in case of determination of the seismic facies, or the available logs measured along the wells through the reservoir, in case of determination of the electrofacies. In the space S1 to Sn of the parameters, clusters will be formed by means of the aforementioned pattern recognition techniques, each cluster representing a seismic facies or an electrofacies (FIG. 1c) in the illustrative examples selected.

An application of the method according to the invention to automatic determination of electrofacies from logs obtained in wells drilled through the reservoir is illustrated in FIGS. 2–5. These logs have been obtained by means of the following four measuring tools : a density sonde, a sonic type sonde, a porositymeasuring neutron sonde and a gamma-ray sonde. At each depth point, with a sampling interval between successive depth points of a half-foot for example, the objects to be classified are represented as points in a four-dimensional space whose co-ordinates are the measurements provided by the four sondes respectively.

Figure 2:
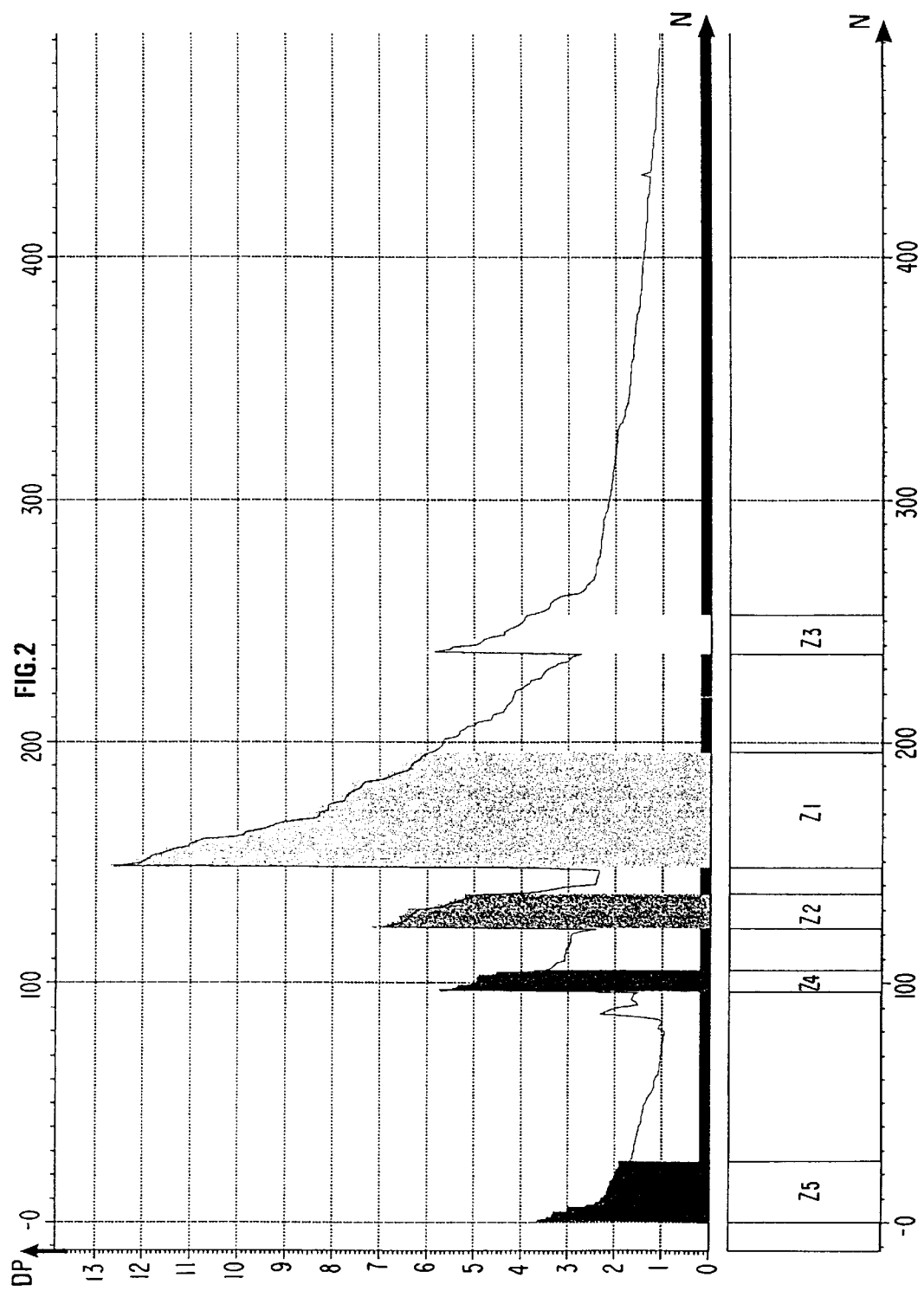
FIG. 2 shows the "mapping" of the modes of the density function, estimated in a space of dimension 3 generated from measurements performed by several logging tools.

The first stage of the method consists in estimating the probability density function. This function is then projected upon a particular axis, as shown in FIG. 2, the value DP of the probability density function being laid off as ordinate and the number N of the object to be classified in the projection sequence selected being laid off as abscissa, an operation referred to as "mapping". The various peaks on this "mapping" of the probability density function correspond to the high-density zones, each zone Z1 to Z6 representing a class and the points in these high-density zones consequently representing the most typical objects of these classes.

Figure 3:
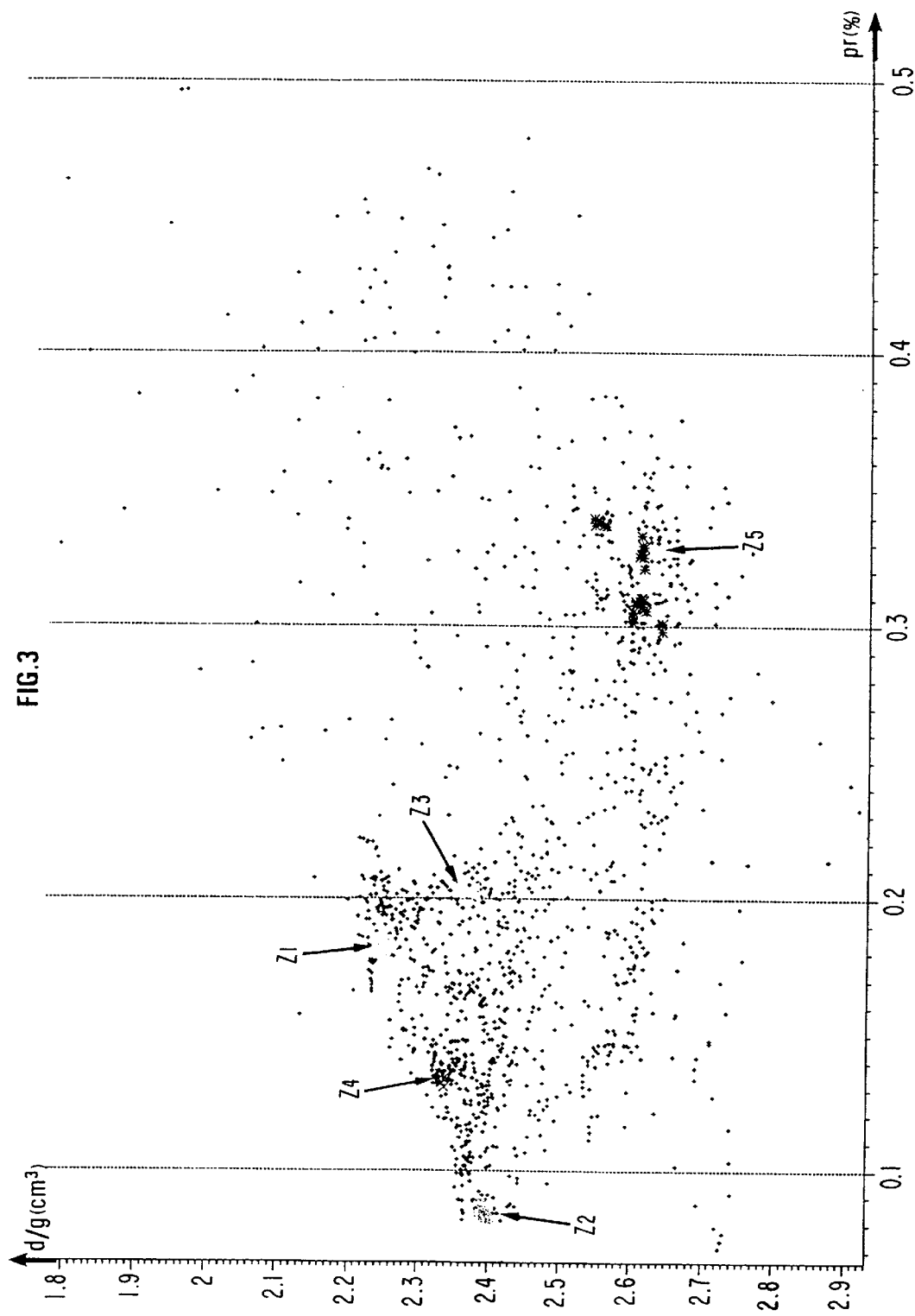
FIG. 3 illustrates the stage of interactive interpretation by means of diagrams, for example a diagram RHOB-NPHI (density d vs porosity pr) allowing to form belonging classes and to select first the most representative points of these classes.
Figure 4:
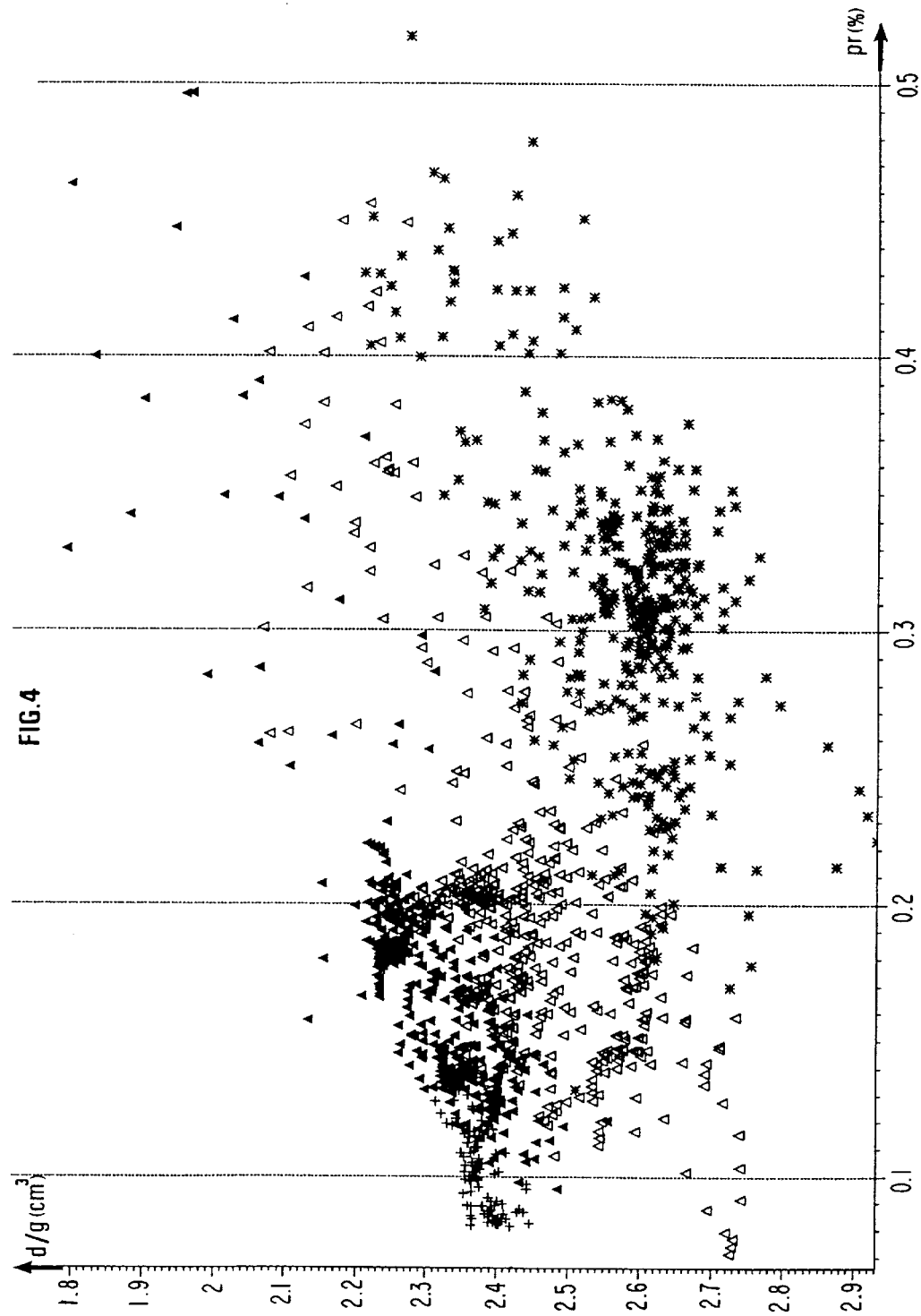
FIG. 4 illustrates the next stage where all the other points are distributed in the classes thus formed, and are represented with the same type of diagram, with the following graphic symbols relative to the belonging thereof to the classes: $\Delta$ (black)$\leftrightarrows Z1$, $+\leftrightarrows Z2$, $\Delta\leftrightarrows Z3$, $\leftrightarrows Z4$ and $*\leftrightarrows Z5$.

The lithologic significance of the classes thus formed then has to be brought out. To that effect, a comparative analysis is performed with the various representations that can be obtained by projecting the points in a 2D sub-space. In the projection of FIG. 3 for example, which is a diagram (density d vs porosity pr), the configuration of the points corresponds to a particular lithologic interpretation. It is used to confirm the lithologic significance of the clusters. The points in zone Z5 of the "mapping" in FIG. 2 correspond to points positioned in zone Z5 in FIG. 3, points which rather correspond to argillaceous sandstones in view of the density d and porosity pr values range.

By means of identical comparative analyses for the points of zones Z3, Z4, Z1 of FIG. 2 and of the corresponding position of these zones in FIG. 3, it is estimated that these points correspond to clean sandstones that become increasingly porous from zone Z3 to zone Z1. Class Z4 rather corresponds to cemented sandstones.

The "mapping" or projection of the probability density function and the analysis thereof therefore allow one to bring out:

the number of classes in the population studied; there are as many classes as there are peaks in the probability density function (FIG. 2);

the most typical representatives of each class, the central points of the density peaks, which can be provided with identification marks such as coding with different colours or a variety of different grey shades as in FIGS. 2 and 3.

Stage No. 3 consists in using these typical points representing the "cores" of the facies in order to construct a classifying function allowing sorting (affiliation) of the points that have not been classified yet (in black in FIG. 3). This function is constructed by means of a well-known discriminant analysis technique.

At the end of this stage, all the points are selectively grouped together in the various classes detected on the projection of the probability density function (FIG. 2) and it is then possible to allocate to each one of them the identification mark relative to the class they belong to, as mentioned above in the presentation of the figures. The density vs porosity diagram obtained is similar to that of FIG. 4.

The logs obtained by means of the various measuring tools (FIGS. 5B to 5D) can thus be completed by a "pseudo-lithologies" column (FIG. 5A) representing, as a function of the depth dp, the various modes (typical points) and the final class of the objects of the modes, as well as the associated right classification probability pb (FIG. 5E).

FIGS. 6 to 8 relate to applications of the methodology described to objects of seismic nature, either pixels of a seismic image or cube (FIGS. 6A, 6B, 6C), or portions of traces defined between two markers.

The acoustic impedances of a section (FIG. 6C), resulting from post-stack stratigraphic inversion of the amplitudes, are studied by using the method described in patent EP-0, 354,112 filed by the applicant. Each pixel of the section, and therefore each sample, is classified in time. A one-dimensional space is used here because the only seismic attribute used to characterize the pixels is the acoustic impedance. The same procedure as that which has been described above leads to the detection of two classes coded V (dark grey) and R (light grey) respectively on the section of FIG. 6A, V corresponding to coastal plain and R to channel filling material.

In FIG. 6B, a threshold has been imposed on the right classification probability in order to represent only the most surely classified seismic pixels. Comparison of the sections of FIGS. 6A, 6B with the lithologic log of the reservoir (FIG. 6C) shows that class R rather corresponds to gritty facies and class V to argillaceous facies.

Figure 7A:
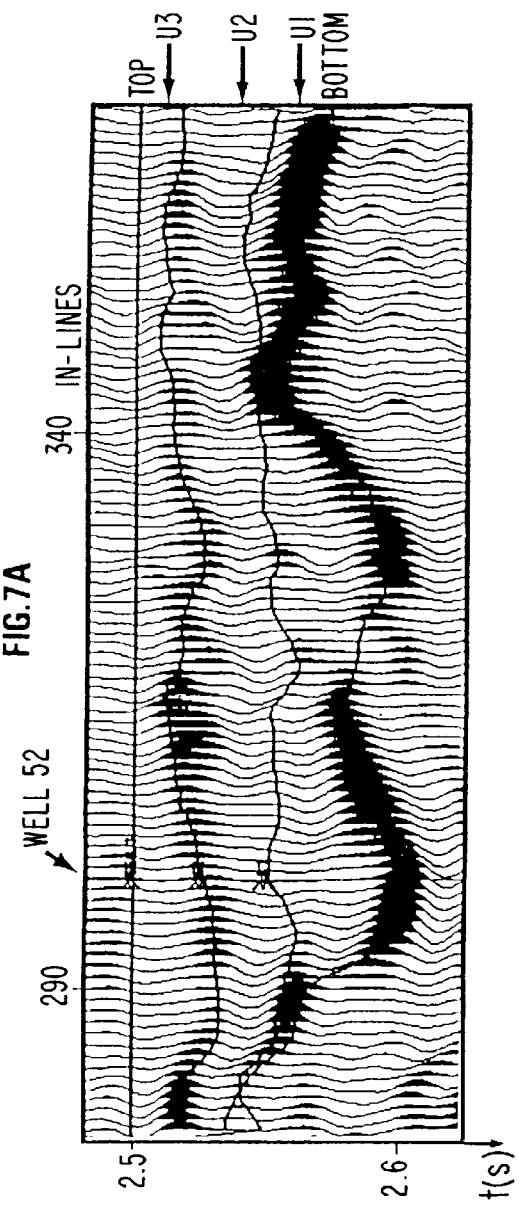
FIGS. 7a, 7b respectively show a record section before inversion and the reflection coefficients after inversion of the same record section.
Figure 7B:
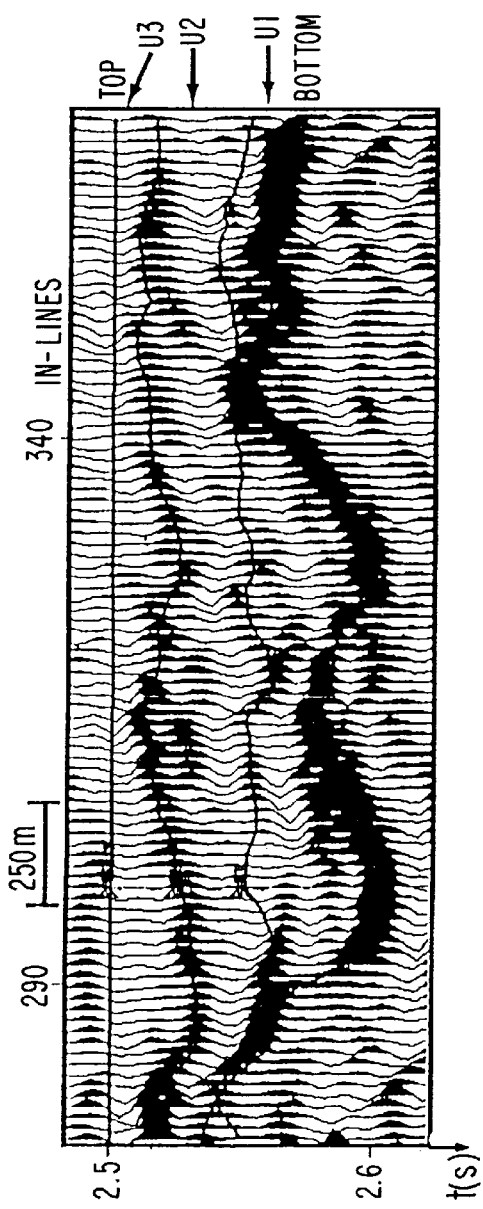

In FIGS. 7A, 7B, the objects that are classified are now trace portions defined between the markers "Top" and $U_3/U_2$ of the seismic image, on a post-stack seismic cube. The parameters characterizing these trace portions are the coefficients of a polynomial expansion to the order 6 of the succession of the seismic amplitudes of the time window between Top and $U_3/U_2$. The trace portions are thus represented in a space of dimension 6.

Still using the same procedure, four classes of trace portions (facies 1, . . . , facies 4) corresponding to very different morphologies or seismic characters have been formed (FIG. 8B). For each class, the average of the amplitudes of the traces that constitute the class is worked out, which gives a sort of "photofit" picture of each class. A class being allocated to each trace portion, the result can be represented on the 3D seismic in the form of a facies map.

A posteriori interpretation of this map in relation to the geologic data available at the level of the wells leads to the conclusion that the different facies must correspond:

to a reservoir of poor quality with marls in good supply (facies 1), to a reservoir of average quality, with fine turbidites (sand/clay alternations) (facies 2), to a reservoir of good quality with sandstone as the dominant feature (facies 3), and to a reservoir of excellent quality almost exclusively made up of very porous sandstone (facies 4).

An application of the method according to the invention to the classification of events linked with the properties and the structure of the subsoil in order notably to facilitate reservoir engineering has been described. Without departing from the scope of the invention, the method can also be applied to the study of images of any complex medium such as the human body for example.

What is claimed is:

1. A method of determining the position in subsoil of a population of physical phenomena linked with physical properties of the subsoil, said method comprising the steps of:

(a) collecting data about the subsoil in order to detect potential classes of physical phenomena existing in the population, the phenomena being marked by points in a multivariate space and defined by an attribute vector, the coordinates of each of the points being attributes associated with the phenomena, using a function expressing a multivariate probability law appropriate for the population;

(b) selecting modes corresponding to higher density zones of the function, the number of modes giving a number of potential classes in the population of the phenomena, where for each mode a set of selected points marks the most representative events of each class;

(c) determining a classifying function from the selected points;

(d) determining probabilities of non-selected points belonging to each of the potential classes by using the determined classifying function; and (e) determining the position of the physical phenomena in the subsoil from the determined probabilities.

2. A method as claimed in claim 1, wherein the phenomena are of a geological or geophysical nature.

3. A method as claimed in claim 1, wherein the phenomena relate to the production of fluids from the subsoil.

4. A method as claimed in claim 1, wherein the attributes are defined by logs measured in at least one well through the subsoil.

5. A method as claimed in claim 1, wherein the attributes are seismic attributes.

6. A method as claimed in 1, wherein the attributes are defined by production measurements.

7. A method as claimed in claim 1, wherein step (b) comprises selecting modes corresponding to high-density zones by projecting the function upon an axis expressing change in events depending on the function, and selecting modes corresponding to significant peaks of the function.

8. A method as claimed in claim 1, wherein step (a) comprises exploration of the subsoil.

9. A method as claimed in claim 1, wherein step (a) comprises conducting in-site measurements in the subsoil.

* * * * *